(12) United States Patent
Svensson

(10) Patent No.: US 10,300,567 B2
(45) Date of Patent: May 28, 2019

(54) DEVICE FOR THE POSITIONING OF A NUMBER OF SUPPORTS ON A RAIL

(71) Applicant: NORDISKA TRUSS AB, Falkenberg (SE)

(72) Inventor: Åke Svensson, Falkenberg (SE)

(73) Assignee: NORDISKA TRUSS AB, Falkenberg (SE)

( * ) Notice: Subject to any disclaimer, the term of this patent is extended or adjusted under 35 U.S.C. 154(b) by 126 days.

(21) Appl. No.: 14/771,774

(22) PCT Filed: Feb. 21, 2014

(86) PCT No.: PCT/SE2014/050217
§ 371 (c)(1),
(2) Date: Aug. 31, 2015

(87) PCT Pub. No.: WO2014/133437
PCT Pub. Date: Sep. 4, 2014

(65) Prior Publication Data
US 2016/0023312 A1 Jan. 28, 2016

(30) Foreign Application Priority Data
Mar. 1, 2013 (SE) .................................. 1330011

(51) Int. Cl.
*B25H 1/10* (2006.01)
*B23P 21/00* (2006.01)
(52) U.S. Cl.
CPC .............. *B23P 21/00* (2013.01); *B25H 1/10* (2013.01)
(58) Field of Classification Search
CPC .................................. B23P 21/00; B25H 1/10
See application file for complete search history.

(56) References Cited

U.S. PATENT DOCUMENTS

| 5,810,341 | A | * | 9/1998 | Williams | ............. | B23Q 16/001 269/289 MR |
| 5,854,747 | A | * | 12/1998 | Fairlie | ..................... | B25B 5/122 269/37 |
| 6,712,347 | B1 | * | 3/2004 | Fredrickson | ........... | B23Q 3/102 269/303 |
| 2008/0179802 | A1 | | 7/2008 | McAdoo et al. | | |
| 2012/0030934 | A1 | * | 2/2012 | Marx | ..................... | G01B 7/008 29/700 |
| 2012/0216406 | A1 | | 8/2012 | Joseph | | |

FOREIGN PATENT DOCUMENTS

WO        WO 90/02650 A1        3/1990

OTHER PUBLICATIONS

International Search Report (ISR) (PCT Form PCT/ISA/210), in PCT/SE2014/050217, dated Jun. 25, 2014.

* cited by examiner

*Primary Examiner* — David P Bryant
*Assistant Examiner* — Nirvana Deonauth
(74) *Attorney, Agent, or Firm* — McGinn I.P. Law Group, PLLC

(57) ABSTRACT

The present invention concerns a device for the positioning of a number of supports (8) on a rail (25), the support (8) being mounted on a carriage (4-7) for the movement of the support (8) to desired position on the rail (25), the carriage (4-7) being provided with means (27) for the connection of the carriage (4-7) with means (15) for the movement of the carriage (4-7) on the rail (25), and the carriage (4-7) being provided with means (29) for the determination of the position of the carriage (4-7) and thereby of the support (8) on the rail (25).

13 Claims, 13 Drawing Sheets

B-B

C-C

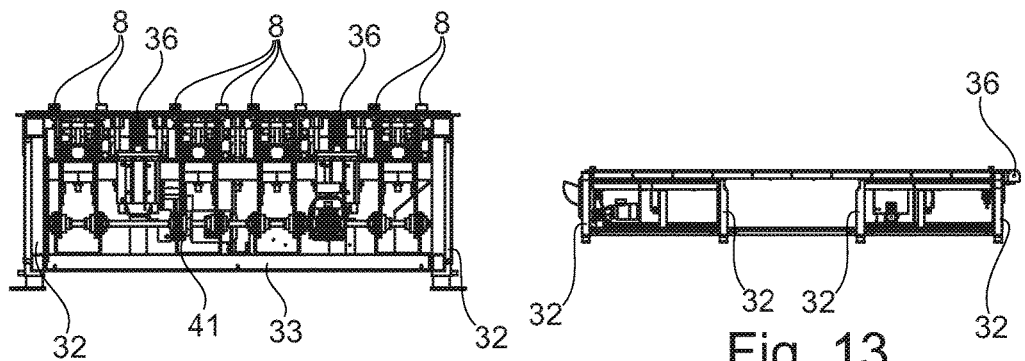
Fig. 15
Fig. 13
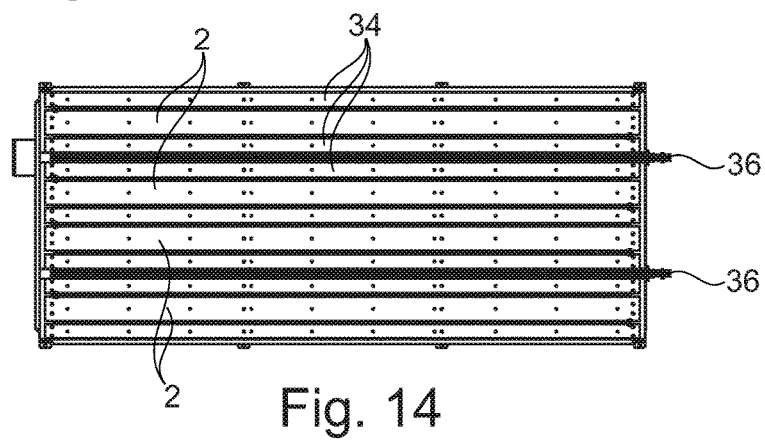
Fig. 14
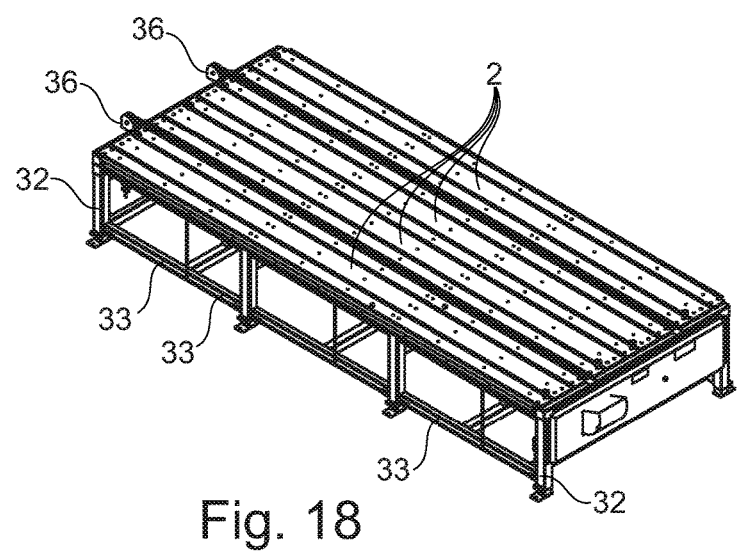
Fig. 18

B-B

C-C

DEVICE FOR THE POSITIONING OF A NUMBER OF SUPPORTS ON A RAIL

The present invention concerns a device for the positioning of a number of supports on a rail and a table with the same.

Known devices of such a type usually comprise a screw of, for instance, the trapezoidal type having a nut, on which the support is arranged. The screw is coupled to a servomotor for the rotation of the same and thereby movement of the nut with the support to a desired position. This means that only one nut having support can be arranged on each screw. A table unit with eight screws has only eight supports and requires eight servomotors, one for each screw. If an application surface of five table units is required for the deployment and assembling of a desired frame e.g., a roof truss, forty screws and forty servomotors will be required, which still only renders forty supports. According to prior art, an increase of the number of supports would mean large difficulties in addition to the large drawbacks of the large number of servomotors and control systems associated therewith.

The object of simplifying devices according to prior art, and simultaneously making the same more versatile by an increase of the number of possible supports, forms the basis of the present invention.

According to the present invention, this object is solved by the device mentioned by way of introduction being given the features of claim 1 and a table having such devices.

By a device according to the present invention, it is possible to construct so-called jig tables, which often consist of five table units having eight puck grooves in each, which gives totally 40 puck grooves in the entire jig table arrangement. By the device according to the present invention, it is possible to have two pucks in each groove, which are moved one after the other by one and the same drive chain. It is furthermore possible, by the device according to the present invention, to drive all drive chains of a table unit using a single servomotor. This is allowed thanks to, among other things, the arrangement of an absolute encoder being assigned to each puck-carrying carriage. By a jig table having devices according to the present invention, it is possible to, by means of suitable software, retrieve different job files, rotate a job, e.g., a roof truss by 360°, flip a roof truss (upper side down), move a roof truss variably in the x & y direction, communicate directly with laser and nailing bridge, communicate with Vision and press of a roof truss plant and presentation of a roof truss graphically in HMI. Upon manual application of material parts on a jig table, it may be suitable to use laser as a means and upon automatic application, it is suitable to use an additional puck in the same groove for pneumatic clamping. In a jig table having devices according to the present invention, the pucks are running on a rail guide and have a lock unit, which clamps the puck in the correct position, wherein the pucks can be positioned by a common servomotor, the pucks can be set by a nailing bridge, and the pucks may be set by a robot.

In the following, the invention will be described in more detail, reference being made to the appended drawings.

FIG. 13 shows a view from the side of a table unit having a number of devices according to the present invention.

FIG. 14 shows a view from above of the table unit in FIG. 13.

FIG. 15 shows an end view of the table unit in FIGS. 13 and 14.

FIG. 18 shows a perspective view of the table unit in FIGS. 13 and 14.

Figure 2:
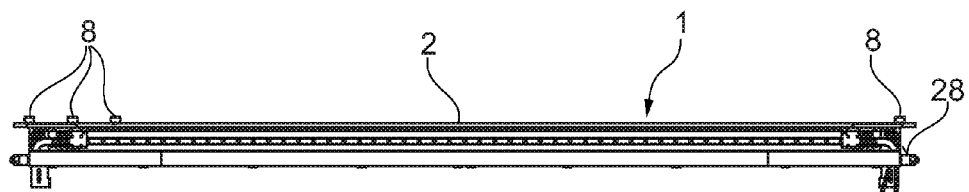
FIG. 2 shows a section along the line A-A in FIG. 1.
Figure 1:
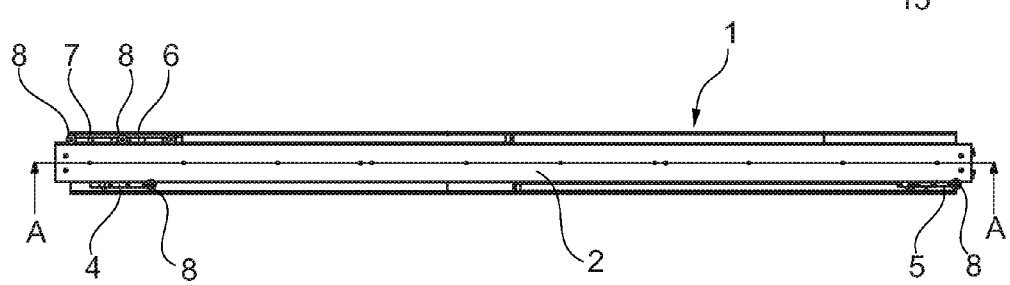
FIG. 1 shows a view from above of a device according to the present invention.
Figure 3:
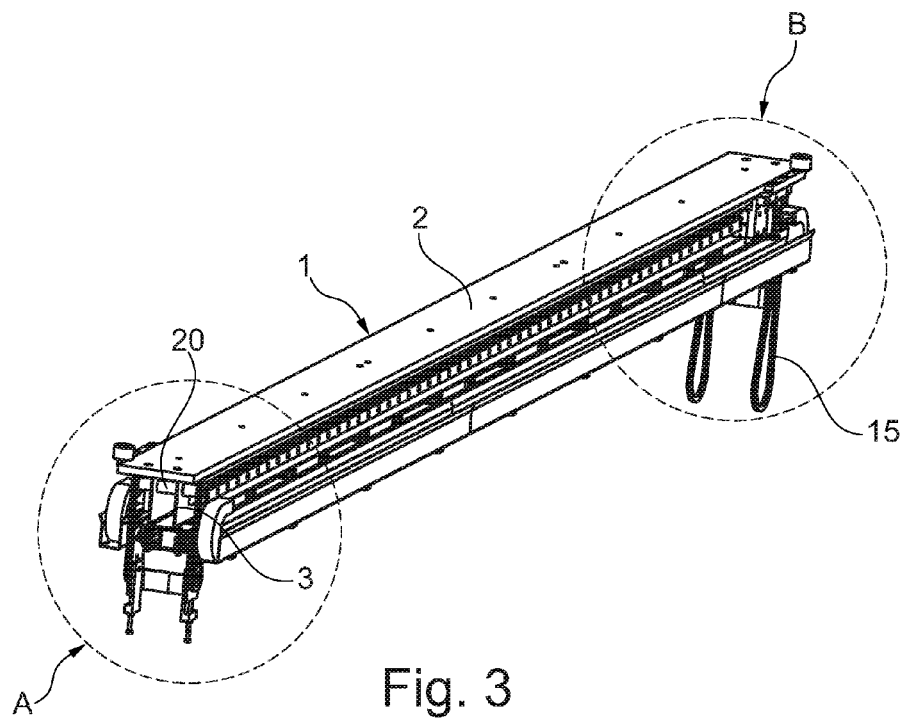
FIG. 3 shows a perspective view of the device in FIGS. 1 and 2.
Figure 4:
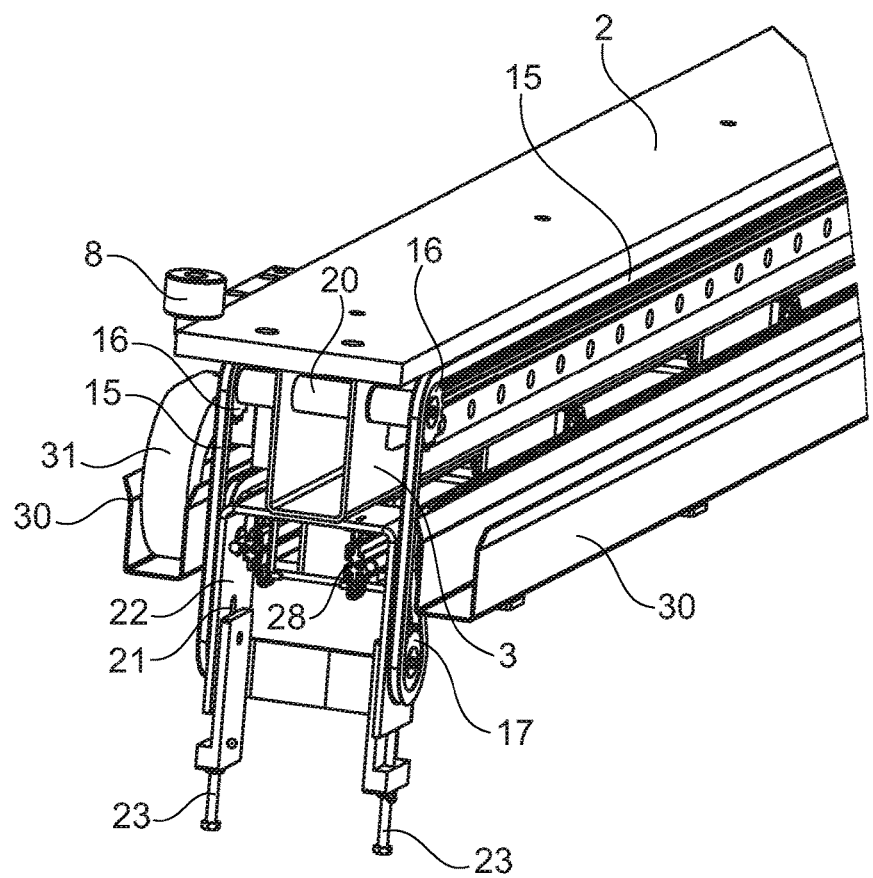
FIG. 4 shows on a larger scale the part of the device according to the present invention contained by the circle A in FIG. 3.
Figure 5:
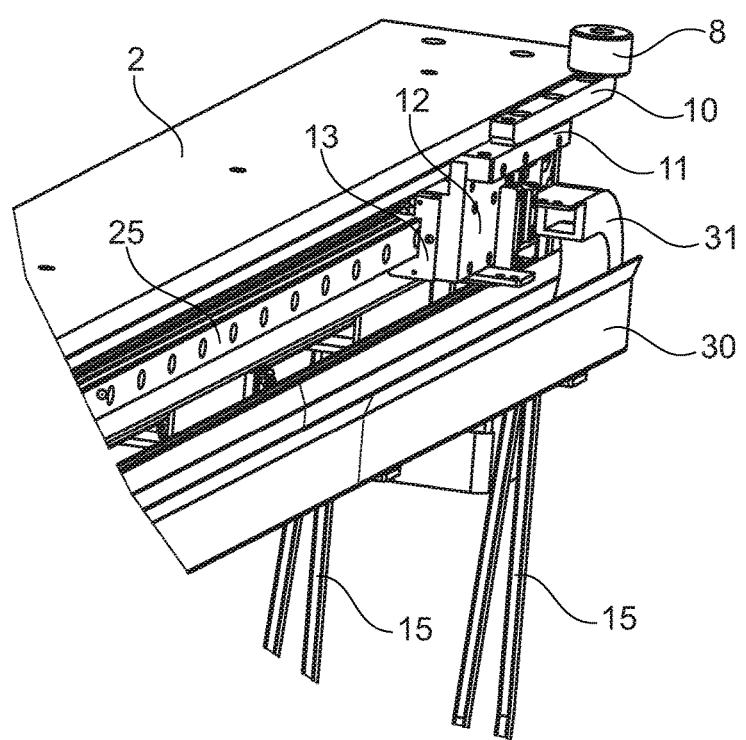
FIG. 5 shows on a larger scale the part the device according to the present invention contained by the circle B in FIG. 3.

One embodiment of the device according to the present invention will now be described in more detail, reference being made to the drawing figures, in which the same reference designations refer to the same parts and in connection with a plant for the manufacture of a frame, e.g., roof truss or the like, wherein application of a number of parts forming part of the roof truss is included, assembling of the parts for allowing movement of the assembled frame for anchoring the parts to each other by placing and pressing-on nail plates across the joints between the parts of an entire roof truss or a part of a roof truss.

The invention is not limited to the use of the device according to the same for the manufacture of roof trusses, but can be used in the production of different types of frames or structures comprising parts which are to be laid out on an application surface for joining to each other temporary or permanently.

The embodiment shown in the drawing figures of a device according to the present invention comprises a beam 1 having an upper part 2 and a bottom part 3 in the form of, for instance, a quadrangular hollow beam having a primarily rectangular cross section, on one short side of which the upper part 2 is fastened. At each edge of the upper part 1, there are arranged two carriages 4, 5, 6, and 7 which are movable backward and forward along the edge and have each a support 8 in the form of a so-called puck, which extends partly in over the edge of the upper part 2 of the beam 1 and which is rotatably journalled on a shaft 9 which projects from the carriage 4, 5, 6, 7 and is fastened to a puck carrier 10.

The puck carrier 10 is mounted on a lid part 11 which in turn is fastened to a carriage side 12, which supports a guide bar 13 which, together with the lid part 11, forms a channel 14 for a drive chain 15. The drive chain 15 extends over sprocket wheels 16 at the ends of the bottom part 3, a tension sprocket wheel 17 and a driving sprocket wheel 18 on a drive shaft 19. The sprocket wheels 16 are rotatable on a shaft 20 extending through the bottom part 3. The tension sprocket wheels 17 are rotatable on each a shaft, which extends through an elongate groove 21 in a U-shaped holder 22 in order to be displaceable along the groove 21 by means of a tightening screw 23. The U-shaped holder 22 is fastened underneath the bottom part 3 of the beam 1 and rests on a fixed part so that the tightening screw 23 will be able to move the shaft with the tension sprocket wheel 17 along the groove 21. The carrier of the tightening screw 23 and the tension sprocket wheel 17 at one edge of the beam 1 may be connected with the carrier of the tightening screw 23 and the tension sprocket wheel 17 at the opposite edge of the beam 1.

The carriage side 12 of each one of the carriages 4-7 supports a rail guide 24 for the co-operation with a guide rail 25, which is mounted on the side of the bottom part 3 of the beam 1 under the edge of the upper part 2 of the beam 1 extending beyond the same and allows displacement of the carriages 4-7 backward and forward along the beam 1 by means of the drive chain 15. The rail guide 22 and the proper guide rail 25 have such cross sections interacting with each other that the carriages 4-7 cannot be removed anywhere along the beam 1 but only at one or the other end of the same and thereby the guide rail 25. The carriages 4-7 have each a lock unit 26 for the co-operation with the guide rail 25 in such a way that the carriages 4-7 individually are lockable to the guide rail 25 or as long as it is not a matter of concern to change the position of the carriage 4-7 and thereby of the puck 8 along the guide rail 25 and the beam 1, which means that the position of the carriage 4-7 is fixed on the guide rail 25 as long as it is not a matter of concern to move it and the puck 8 to a new position. Furthermore, the carriage side 12 of each one of the carriages 4-7 supports a cylinder lock 27 for the connection of the carriage 4-7 that is about to be moved with the drive chain 15. The cylinder locks 27 of the carriages 4-7 are pneumatic and are coupled to a common valve package and a source of compressed air.

Figure 6:
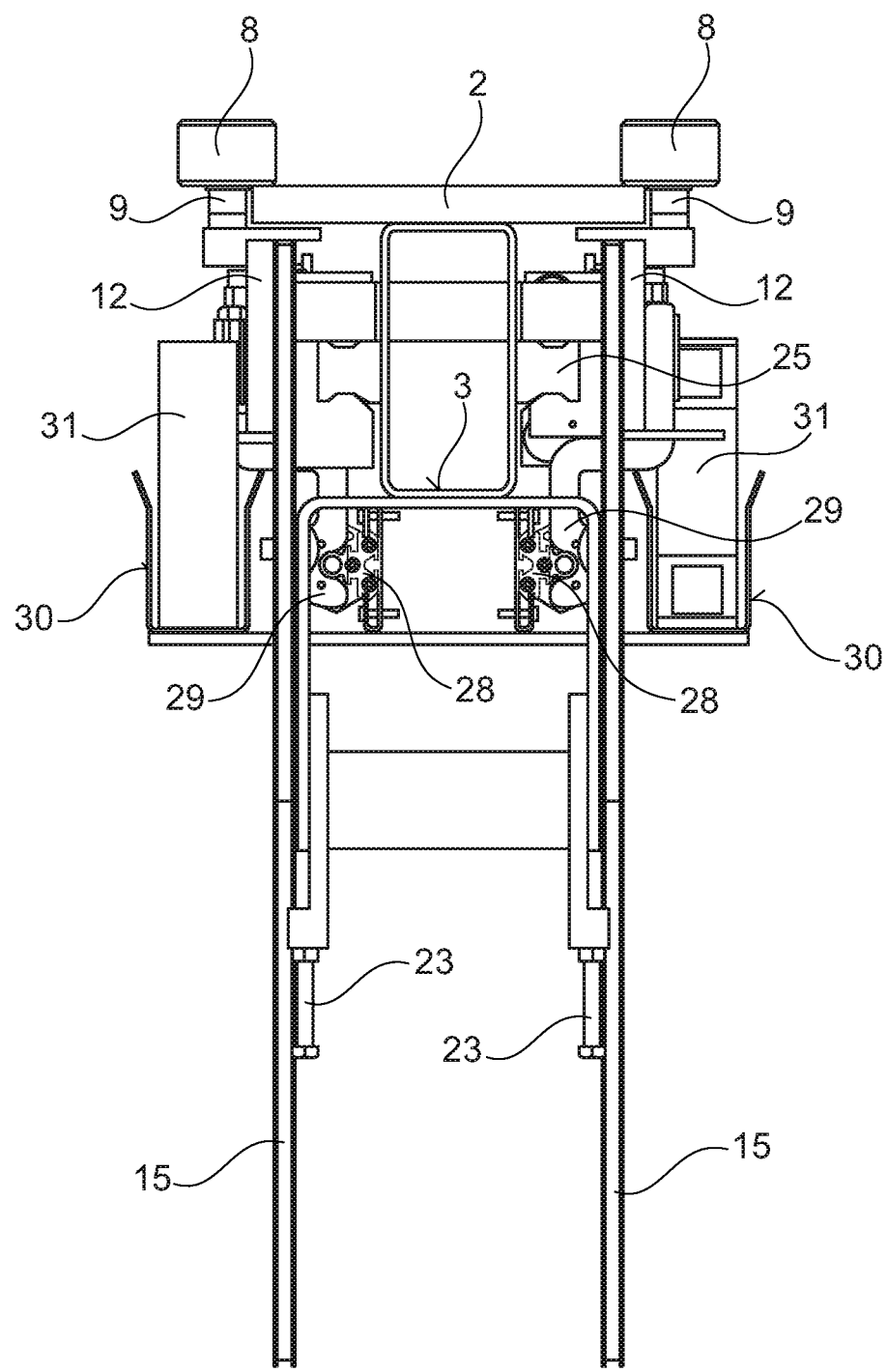
FIG. 6 shows on a larger scale an end view of the device according to the present invention shown in FIGS. 1 and 2.
Figure 9:
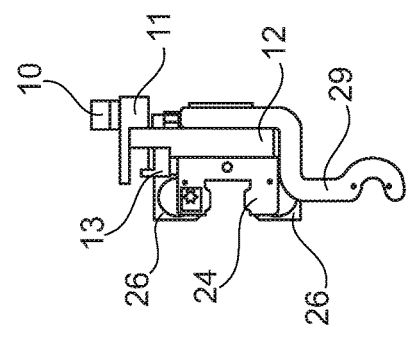
FIG. 9 shows an end view of the carriage in FIGS. 7 and 8.
Figure 10:
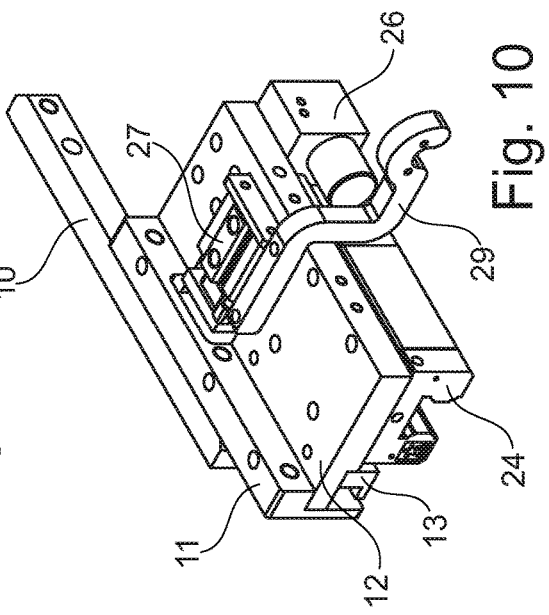
FIG. 10 shows a perspective view of the carriage in FIGS. 7-9.
Figure 7:
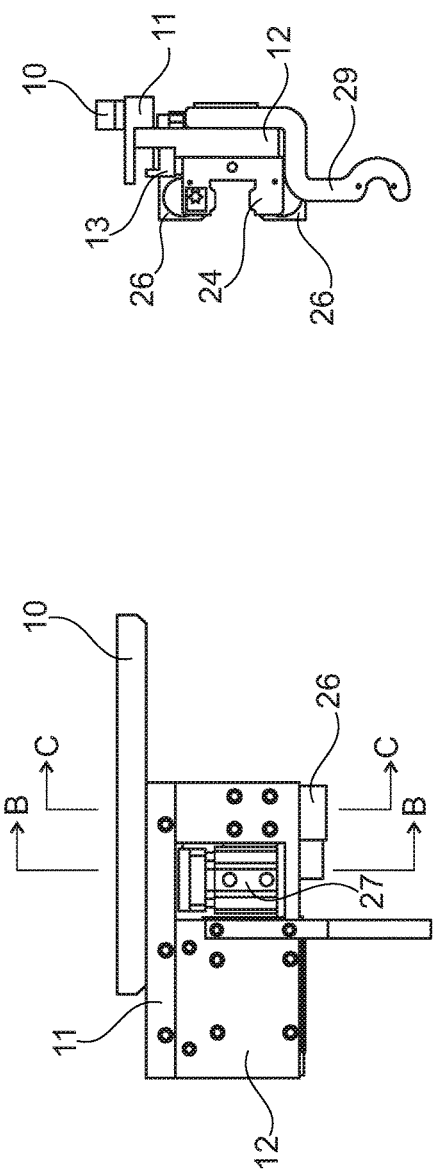
FIG. 7 shows on a large scale a view from the side of a carriage of the device according to the present invention.
Figure 8:
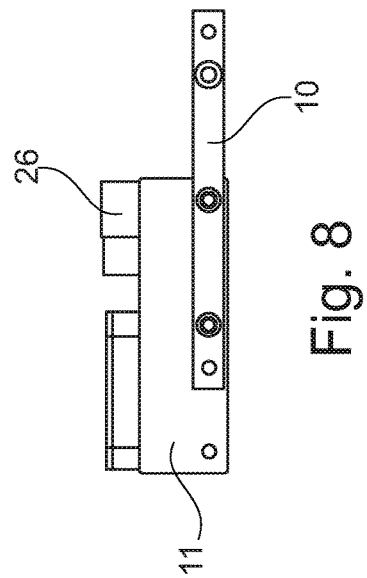
FIG. 8 shows a view from above of the carriage in FIG. 7.
Figure 11:
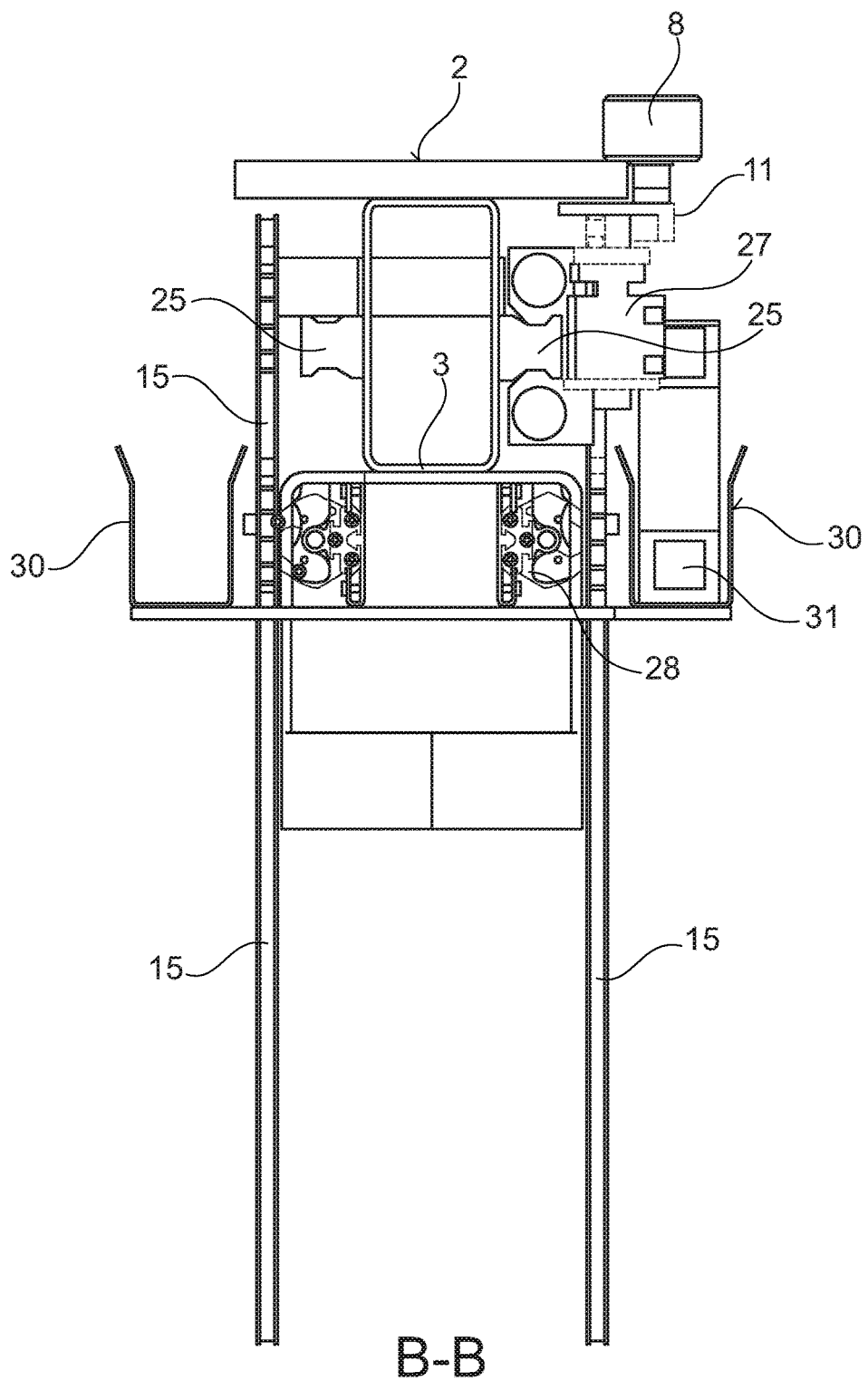
FIG. 11 shows a section along the line B-B in FIG. 7 with the carriage in a device according to the present invention.
Figure 12:
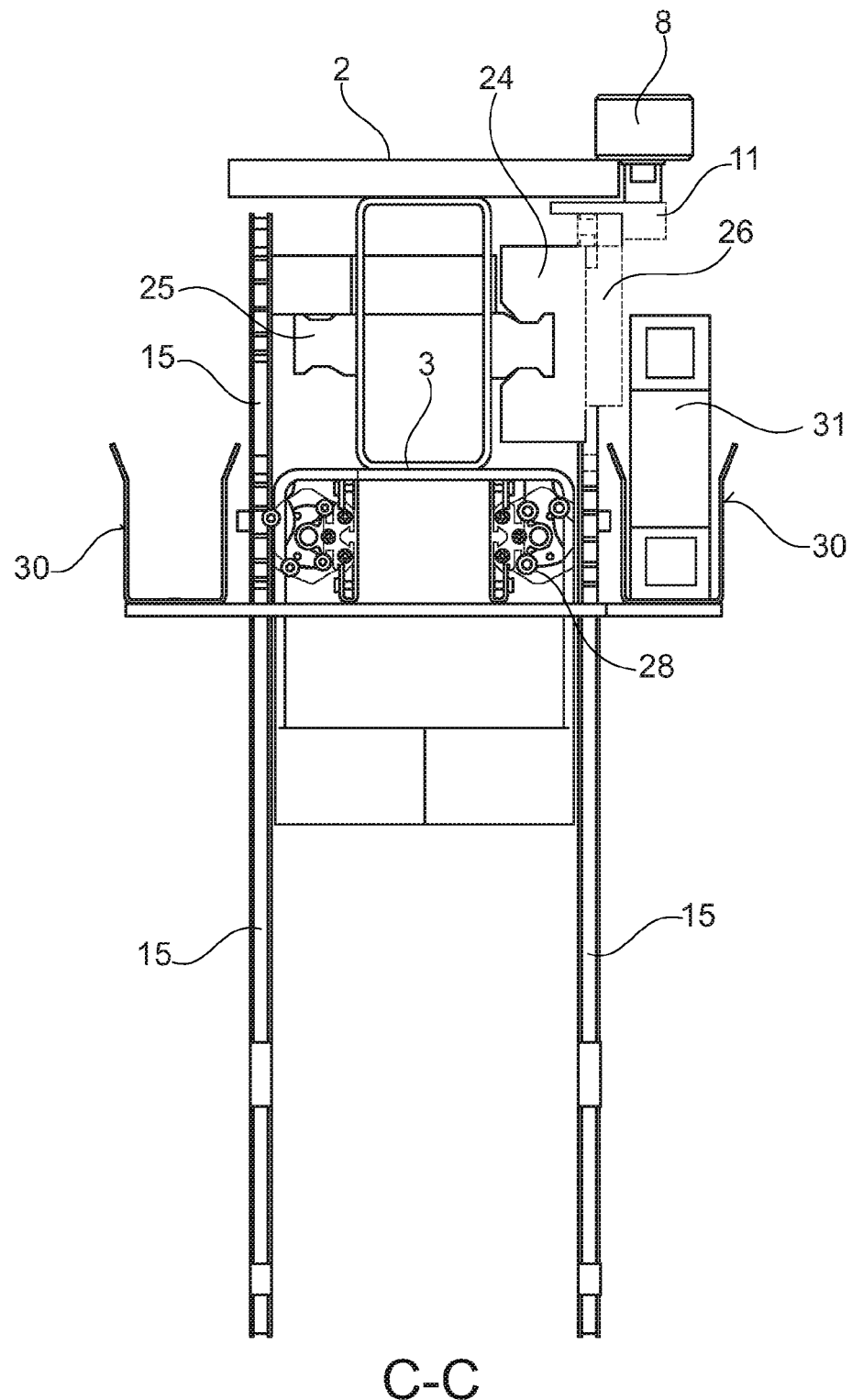
FIG. 12 shows a section along the line C-C in FIG. 7 with the carriage in a device according to the present invention.
Figure 16:
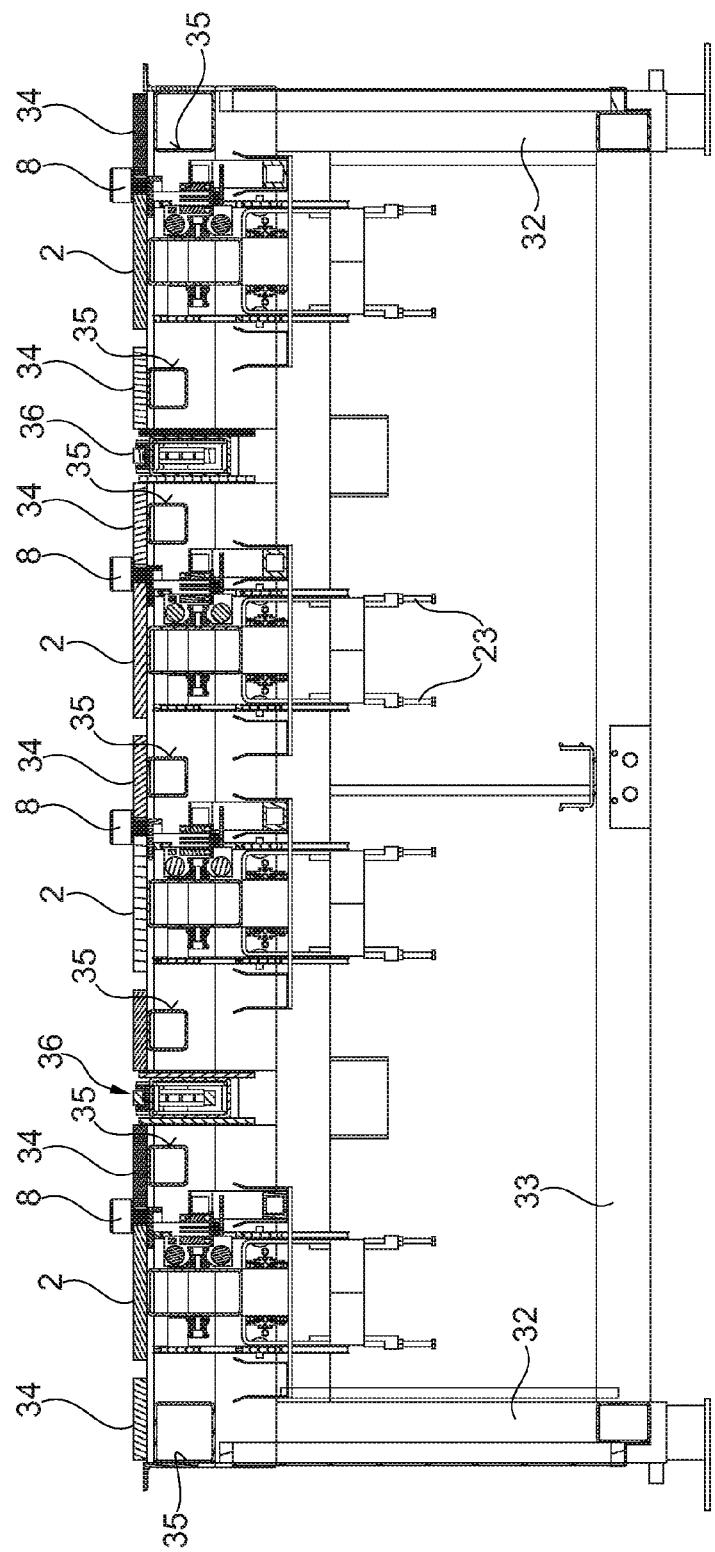
FIG. 16 shows on a larger scale a section along the line B-B in FIG. 13.

For the determination of the position of the carriages 4-7 along the beam 1, a linear absolute encoder of magnetic type is arranged, which may be of known type per se and is marketed under the trademark "Temposonics". The linear absolute encoder comprises a waveguide 28, which extends along the beam 1 at the underside of the bottom part 3 under the guide rail 25 to allow co-operation with a magnet-carrying arm 29, which is fastened to the carriage side 12 and the end of which is formed to at least partly surround the waveguide 28 as is seen in FIG. 6. The waveguide 28 may be tubular and be of a magnetostrictive type for the co-operation with a permanent magnet on the end of the arm 29.

On each side of the beam 1, a cable duct 30 is furthermore arranged for a cable drag 31. On the underside, the lower tubular part 3 of the beam 1 supports a number of attachments and supports for the different parts included in the device.

In the drawing FIGS. 13-19, the utilization of devices according to the present invention is illustrated for the provision of a table unit, viz. a so-called jig table unit, which comprises four devices according to the drawing FIGS. 1-12, which are placed side by side with spaces between them in a table stand consisting of a number of legs 32 and beams 33 connecting the same. Between the devices, there are filling parts 34, which are of the same type as the upper parts 2 of the beams 1 so as to, together with the same, form an application surface, and which are fastened to quadrangle hollow beams 35. Between the upper parts 2 and the filling parts 34, grooves are formed for the puck shafts 9 carried by the carriages 4-7, so that the pucks 8 extend in over the application surface. Conveyors 36 are arranged between the outer devices and the centrally placed devices following next. The conveyors 36 are vertically adjustable for raising the frame produced on the application surface and transporting away the same for continued processing. The conveyors 36 comprise chains, which are running over sprocket wheels at each end and which are driven by a motor M.

Figure 17:
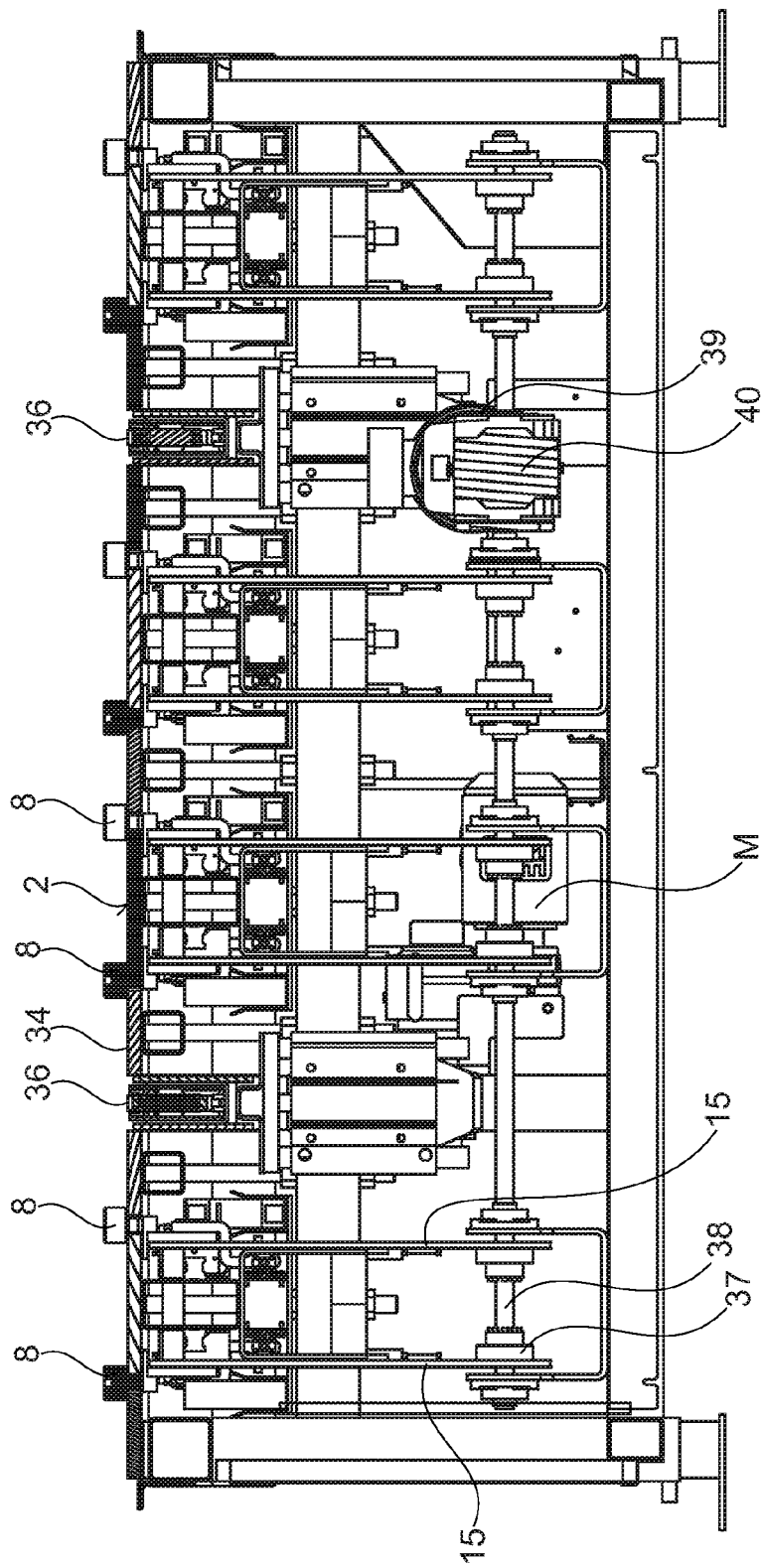
FIG. 17 shows on a larger scale a view along the line C-C in FIG. 13.
Figure 19:
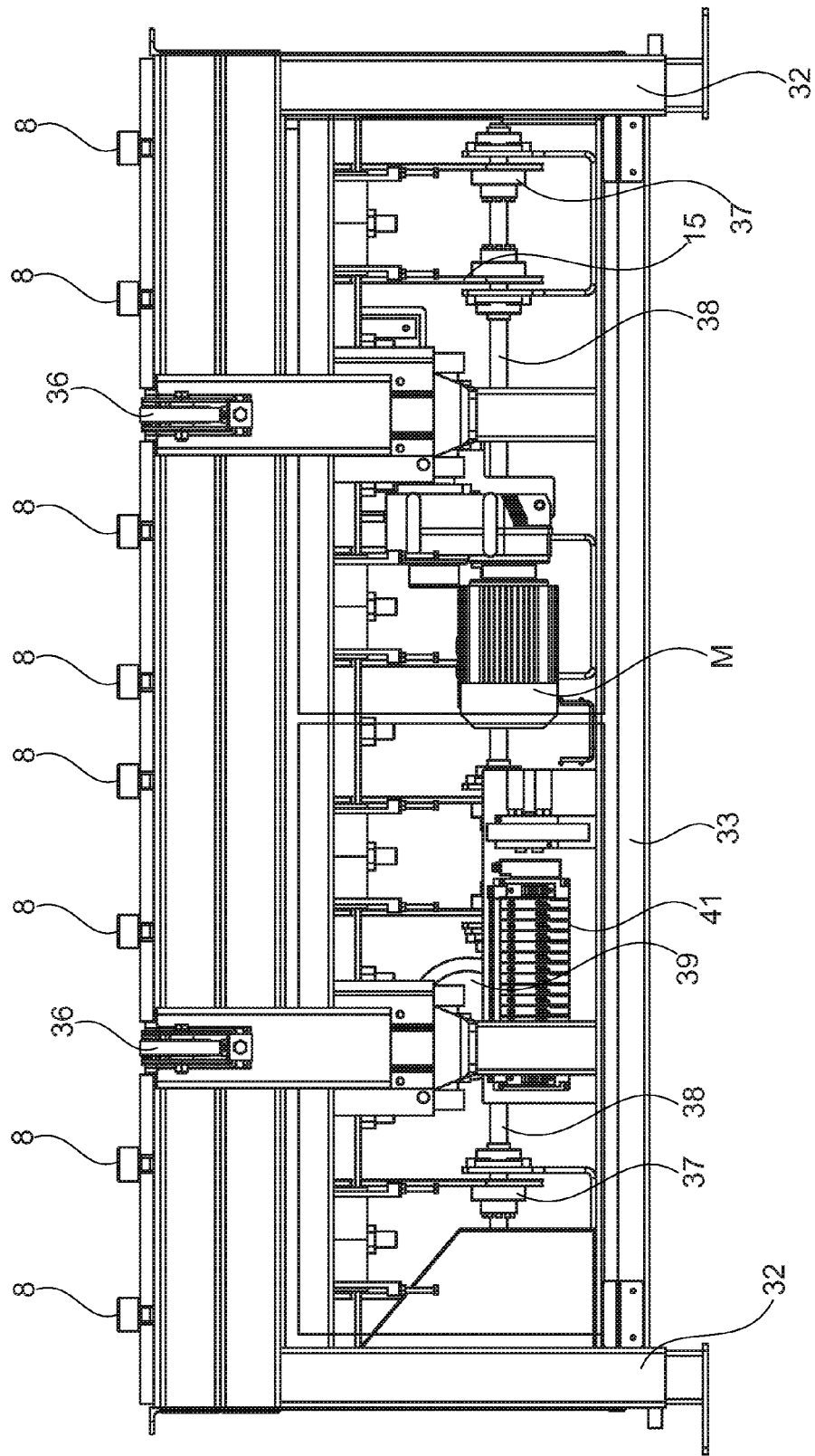
FIG. 19 shows on a larger scale the end view of the table unit shown in FIG. 15.

In FIG. 17, it is seen that the drive chains 15 of the different devices extend over sprocket wheels 37 of a common drive shaft 38, which is coupled to a motor 39 via a transmission 40, so that all the chains 15 of all the devices of the table unit are driven by means of a single motor 39 via one and the same drive shaft 38. The pneumatic cylinder locks 27 are, via compressed-air lines, coupled to a valve package 41.

The device according to the present invention obviously allows the construction of a table unit of the type shown in the drawing FIGS. 13-19 having two puck carriages 4-7 in each groove and thereby totally 16 pucks 8 on the application surface. The pucks 8 are placeable in the desired position one after the other after the detachment of the carriage 4-7 by means of the lock unit 26 from the locking on the guide rail 25 and connection of the carriage 4-7 with the drive chain 15 by means of the lock unit 27. The lock unit 26 comprises a piston or clamping jaw, which clamps the guide rail 25 and is spring-loaded into engagement with the guide rail 25, while the lock unit 27 comprises a double-acting cylinder or piston. By the interaction between the permanent magnet arm 29 of the carriage 4-7, having the puck 8 that is to be moved or positioned, and the tubular waveguide 28 of the linear absolute encoder, the position of the puck 8 is determined where the drive chain 15 is released by adjusting the double-acting piston and the clamping jaw is released for adjustment by means of the spring into engagement with the guide rail 25 and thereby locking of the carriage 4-7 in the new position. The lock units 26 and 27 are pneumatic and coupled to the valve package 41.

Figure 20:
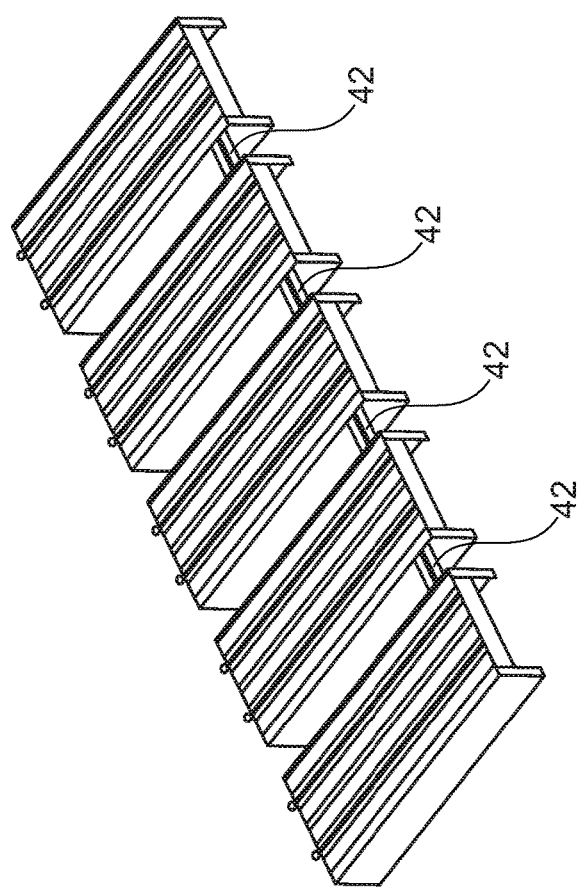
FIG. 20 shows a perspective view of a jig table for the application and assembly of parts of a frame, which comprises five interconnected table units placed beside each other of the type shown in FIGS. 13-19.

The table unit described above having four devices according to the present invention is possible to combine with further similar table units as illustrated in drawing FIG. 20, which shows five table units which are placed parallel to each other and interconnected by means of pipes 42 for various driving and control means. For instance, the absolute encoders are coupled to a computer system having suitable software for the deployment of the pucks and control of their positions in relation to basic drawing data.

Figure 21:
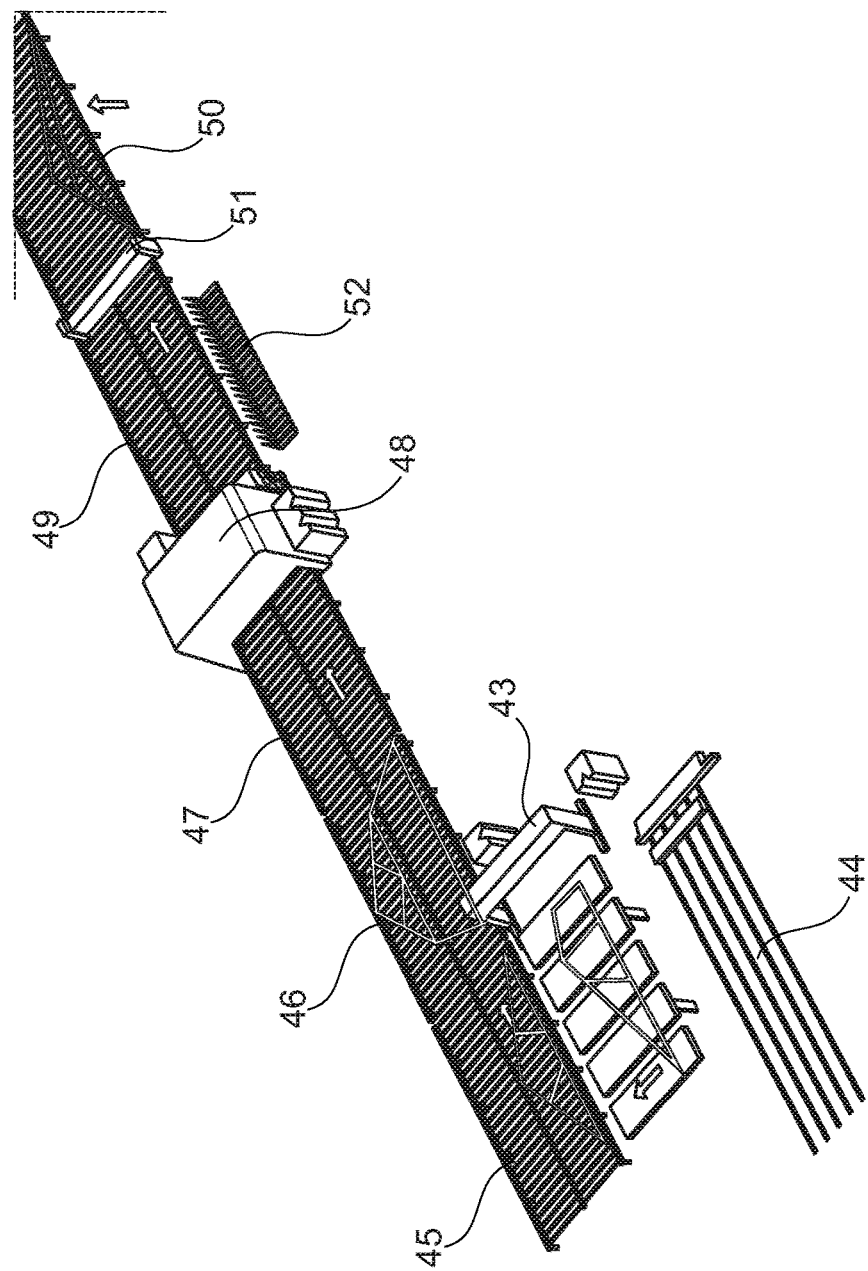
FIG. 21 shows a perspective view of a sample plant having a jig table according to FIG. 20.

In FIG. 21, a plant for the manufacture of different types of roof trusses is illustrated, in which table units of the type described above are included for the co-operation with a nailing bridge 43 of the parts of a roof truss for assembling. The parts are fetched from a storage 44 and are laid out on the application surface formed by the table units, whereupon the nailing bridge 43 is moved backward and forward over the application surface for the assembling of the parts so that movement of the roof truss from the application surface to the table 45 and from there to tables 46 and 47 as well as further to the nail plate press 48 for the assembling of the parts of the roof truss by means of nail plates on both sides of each joint can take place. From the nail plate press 48, the roof trusses are moved to the table 49 and then to the table 50. Between the table 49 and the table 50, a roll press 51 is arranged for the post-pressing of the nail plates. Along the table 49, a number of nail plate magazines 52 are arranged.

Plants for the assembly of roof trusses are exemplified in the Swedish patent 0601495-5/530069, which is a nail plate press, and in the Swedish patent 0802105-7/532903, which is of the vision type.

By the device according to the present invention, it is, as illustrated in FIG. 21, possible to manufacture different types of roof trusses one after the other by the repositioning of the pucks 8 on the table units by means of software for computer aided design, which also controls the nailing bridge 43 and the nail plate press 48.

Numerous modifications of the embodiment described above are possible within the scope of the general idea of the invention defined in the subsequent claims.

The invention claimed is:

1. A device for positioning a number of supports on a guide rail, the device comprising: a beam having an upper part and a bottom part, at least one carriage arranged at an edge of the upper part and movable backward and forward along the edge of the upper part, a support of the number of supports extending up over a surface of the upper part, each carriage of the at least one carriage having a carriage side supporting a rail guide cooperating with the guide rail, the at least one carriage each having a lock unit cooperating with the guide rail allowing the at least one carriage to individually be lockable to the guide rail as long as a position of the carriage is to be unchanged, wherein the support of the number of supports is mounted on the at least one carriage for movement of the support to a desired position on the guide rail, the at least one carriage comprising means for connection of the at least one carriage with means for movement of the at least one carriage to the desired position on the guide rail and only during the movement of the at least one carriage, and the at least one carriage comprising means for determination of the position of the at least one carriage and thereby of the support on the guide rail, wherein said means for determination of the position comprises a linear absolute encoder comprising a waveguide which extends along the beam at an underside of the bottom part of the beam under the guide rail allowing cooperation with a magnet carrying arm which is fastened to the carriage side and the end of which at least partly surrounds the waveguide; wherein the means for connection of the at least one carriage comprises a cylinder lock.

2. The device according to claim 1, wherein the cylinder lock for movement of the at least one carriage comprises a chain, which extends along the guide rail for the movement of the at least one carriage backward and forward on the rail and is driven by a motor.

3. The device according to claim 2, wherein the means for the connection of the at least one carriage with the chain comprises double-acting means for adjustment into or out of engagement with the chain.

4. The device according to claim 3, wherein the at least one carriage includes a guide bar for the chain, and the guide bar surrounds the chain at least partly.

5. The device according to claim 1, wherein the at least one carriage comprises at least, two principally similar carriages having a support each are arranged on the guide rail for the movement to and from the desired position one after the other by a same chain.

6. A table for application and assembling of parts for a frame, wherein a number of devices according to claim 1 are arranged parallel to each other for formation of an application surface, and a chain drive common to the devices is provided at one end of the application table.

7. The table according to claim 6, wherein each chain extends around a cogwheel on a shaft common to all cogwheels, which in turn is coupled to a motor directly or via a transmission.

8. The table according to claim 7, wherein the parts for the frame include any of a roof truss and an assembly of a floor.

9. The device according to claim 1, wherein the means for movement of the at least one carriage comprises a single chain.

10. The device according to claim, 1, wherein the means for movement of the at least one carriage is driven by a single motor.

11. The device according to claim 1, wherein the means for movement of the at least one carriage comprises a single chain, which extends along the guide rail for the movement of the at least one carriage backward and forward on the guide rail and is driven by a single motor.

12. The device according to claim 1, wherein the cylinder lock of the at least one carriage are pneumatic and are coupled to a common valve package and a source of compressed air.

13. The device according to claim 1, wherein, the waveguide comprises a tubular shape and is formed of a magnetostrictive type for the co-operation with a permanent magnet on the end of the magnet-carrying arm.

\* \* \* \* \*